US008034247B2

(12) United States Patent
Tsuboi et al.

(10) Patent No.: US 8,034,247 B2
(45) Date of Patent: Oct. 11, 2011

(54) MANUFACTURING METHOD OF SILICON NOZZLE PLATE AND MANUFACTURING METHOD OF INKJET HEAD

(75) Inventors: Kazuhiko Tsuboi, Tama (JP); Tohru Hirai, Hino (JP)

(73) Assignee: Konica Minolta Holdings, Inc. (JP)

( * ) Notice: Subject to any disclaimer, the term of this patent is extended or adjusted under 35 U.S.C. 154(b) by 766 days.

(21) Appl. No.: 11/805,891

(22) Filed: May 25, 2007

(65) Prior Publication Data

US 2007/0278181 A1 Dec. 6, 2007

(30) Foreign Application Priority Data

May 31, 2006 (JP) ................................ 2006-151376

(51) Int. Cl.
*C23F 1/00* (2006.01)
*G11B 5/127* (2006.01)

(52) U.S. Cl. ............................................ 216/2; 216/27

(58) Field of Classification Search ................ 216/2, 58, 216/74, 79, 27, 84; 29/890.1; 347/20; 428/32.1
See application file for complete search history.

(56) References Cited

U.S. PATENT DOCUMENTS 5,204,690 A * 4/1993 Lorenze et al. ................ 347/93
5,697,144 A * 12/1997 Mitani et al. .................... 29/611
6,184,109 B1 2/2001 Sasaki et al.
2002/0056698 A1 5/2002 Makigaki et al.
2004/0004649 A1 * 1/2004 Bibl et al. ....................... 347/68

FOREIGN PATENT DOCUMENTS

EP 1065059 1/2001
JP 5-36825 2/1993
JP 10-157149 6/1998
JP 2004-253695 9/2004

OTHER PUBLICATIONS

Rossnagel, Stephen M.; Cuomo, Jerome J.; Westwood, William D. Handbook of Plasma Processing Technology Fundamentals, Etching, Deposition, and Surface Interactions. Noyes Publications, New York, 1990, p. 196.*
International Search Report for Patent Application No. EP 07 25 2095 mailed Sep. 28, 2007.
European Search Report for Application No. 07252095.0-2304 dated Sep. 28, 2007.

* cited by examiner

*Primary Examiner* — Shamim Ahmed
*Assistant Examiner* — Patti Lin
(74) *Attorney, Agent, or Firm* — Cantor Colburn LLP

(57) ABSTRACT

A manufacturing method of a silicon nozzle plate, having; a film forming process to provide the film representing an etching mask for etching the silicon substrate on a surface of the silicon substrate; a pattern film forming to form a pattern film by partially removing the film based on a nozzle hole forming pattern and an outer shape forming pattern; a silicon substrate etching process to form nozzle holes based on the nozzle hole forming pattern representing the etching mask, and to form a half etching portion at least in a part of the silicon substrate based on the outer shape forming pattern; and a silicon substrate separating process to separate the silicon substrate by splitting along the half etching portion.

8 Claims, 5 Drawing Sheets

MANUFACTURING METHOD OF SILICON NOZZLE PLATE AND MANUFACTURING METHOD OF INKJET HEAD

This application is based on Japanese Patent Application No. 2006-151376 filed on May 31, 2006, in Japanese Patent Office, the entire content of which is hereby incorporated by reference.

FIELD OF THE INVENTION

The present invention relates to a manufacturing method of a silicon nozzle plate and a manufacturing method of an inkjet head.

BACKGROUND OF THE INVENTION

Conventionally, it is proposed that a head member such as a liquid chamber of an inkjet head and a common liquid chamber is formed by etching of a silicon substrate (silicon wafer) (refer to Patent Documents 1 and 2).

As described above, when a silicon is used for the inkjet member, it is necessary that a plurality of head chip members are formed on the silicon substrate (silicon wafer), and they are separated into each chip. In this case, as a method by which the silicon wafer is divided into the chips, a dicing is generally used. The dicing is a method where a blade having diamond powder adhering on its circumference is rotated at a high speed and the blade is moved along a line in which the chip is cut out and the wafer is cut.

Further, in order to solve a problem of allegation of debris due to the dicing, for example, as written in Patent Document 2, a predetermined outer shape forming mask is formed in the silicon wafer, an anisotropic etching is conducted, and it is separated into each chip by a V-shaped groove. Or as the cut out method of the semiconductor chip, written in Patent Document 3, there is proposed a method where a first and a second V-shaped groove are formed, then the wafer is cleaved by concentrating a stress on the first and the second V-shaped grooves to separated the wafer into each chip.

Further, in order to solve the problem of chip flaw by the dicing, as written in Patent Document 1, a method in which the dicing and anisotropic etching are used together, is also proposed.

[Patent Document 1] Tokkai No. 2004-253695

[Patent Document 2] Tokkaihei No. 10-157149

[Patent Document 3] Tokkaihei No. 5-36825

SUMMARY OF THE INVENTION

However, there are the following problems when the dicing or the separation methods written in Patent Documents 1-3 are applied to the silicon nozzle plate.

When the outer shape forming is conducted by dicing, there are problems that the debris of the silicon is adhered to the nozzle plate surface, and a repulsive ink layer formed on the nozzle plate surface is damaged. Further, when a minute flaw is created in an end surface at the time of cutting, crack or chip is created from the flaw. In the case of particularly a thin silicon substrate used for the nozzle plate, it is a problem in the process. As written in Patent Document 1, also when the dicing and anisotropic etching are used concomitantly, it is difficult to solve these problems.

Also, by using the technology written in Patent Document 2, it is also considered that whole outer shapes are separated simultaneously with the nozzle forming by the etching processing, however subsequent handling becomes extremely difficult.

Furthermore, in the technology written in Patent Document 3, since forming of V-shaped groove for the cleavage and the forming of nozzle hole are conducted in separated process, the manufacturing process becomes complicated.

The present invention is attained in view of the above aspects, and an object of the present invention is to provide a manufacturing method of a silicon nozzle plate and a manufacturing method of an inkjet head, in which the problem of silicon debris in the outer shape forming process is not occur, handling after the process thereof is easy, and the manufacturing process can be simplified.

The above problems are solved by the following methods.

1. A manufacturing method of a silicon nozzle plate, wherein nozzle holes are formed by etching a silicon substrate, having steps of: forming a film to provide the film representing an etching mask for etching the silicon substrate on a surface of the silicon substrate; forming a pattern film by partially removing the film based on a nozzle hole forming pattern and an outer shape forming pattern; etching the silicon substrate to form nozzle holes based on the nozzle hole forming pattern representing the etching mask, and to form a half etching portion at least in a part of the silicon substrate based on the outer shape forming pattern; and separating the silicon substrate by splitting along the half etching portion.

2. A manufacturing method of an inkjet head, wherein a head chip and a silicon plate on which nozzle holes are formed by etching a silicon substrate are bonded to manufacture the inkjet head, having steps of: forming a film to provide a film representing an etching mask for etching the silicon substrate on a surface of the silicon the silicon substrate; forming a pattern film by partially removing the film based on a nozzle hole forming pattern, an outer shape forming pattern and a tab portion adjacent to the outer shape forming pattern; etching the silicon substrate using the pattern film as the etching mask to form nozzle holes based on the nozzle hole forming pattern, to form a first half etching portion at least in a part of the silicon substrate based on the outer shape forming pattern, and to form a second half etching portion along a border between the outer shape forming pattern and a tab portion; separating the silicon substrate by splitting along the first half etching portion; and splitting the tab portion from the separated silicon nozzle plate along the second half etching portion after jointing with the head chip.

DETAILED DESCRIPTION OF THE INVENTION

The manufacturing process of the silicon nozzle plate and inkjet head having the silicon nozzle plate related to the present invention will be described below with reference to the drawings.

The First Embodiment

Figure 1:
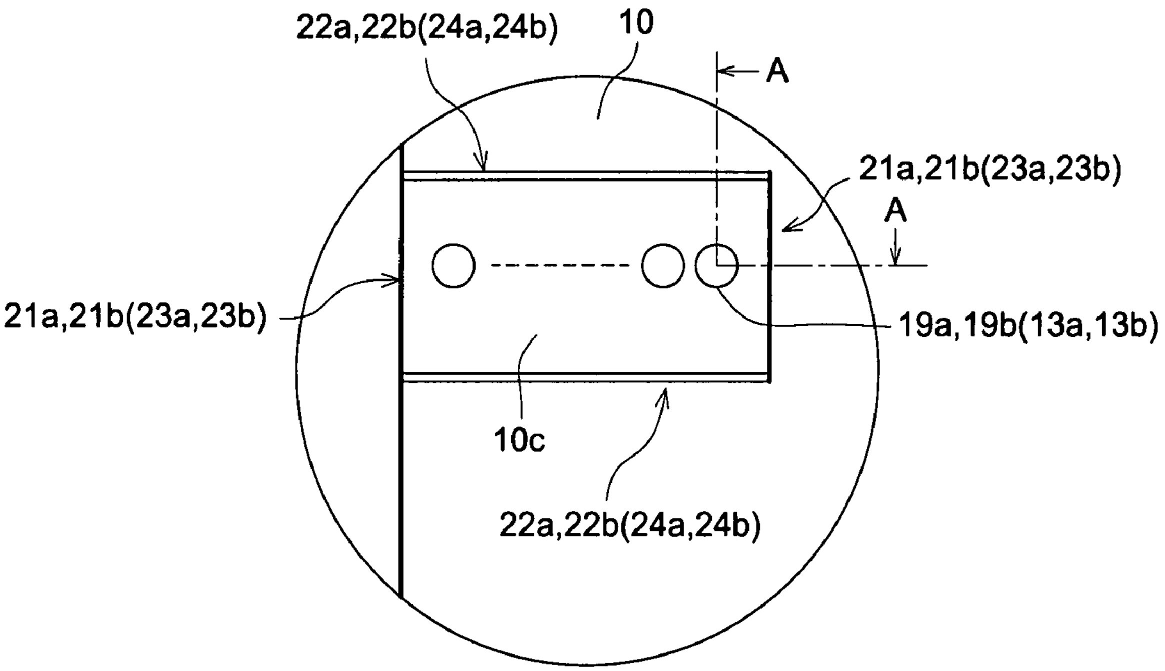
FIG. 1 is a view showing a forming pattern of a silicon substrate.
Figure 2:
FIG. 2(*a-h*) is a cross-sectional view showing a first embodiment of a manufacturing process of a silicon nozzle plate.
Figure 2:
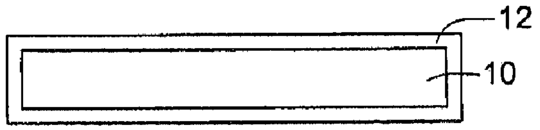
Figure 2:
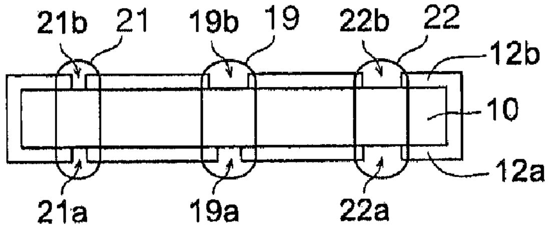
Figure 2:
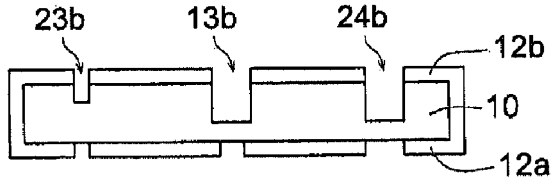
Figure 2:
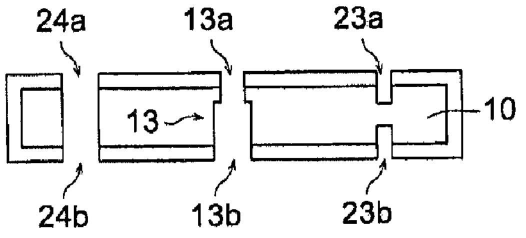
Figure 2:
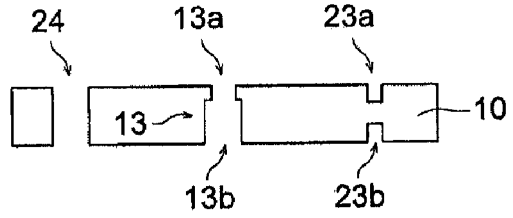
Figure 2:
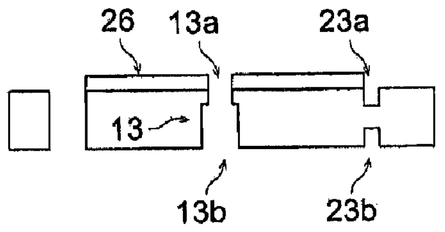
Figure 2:
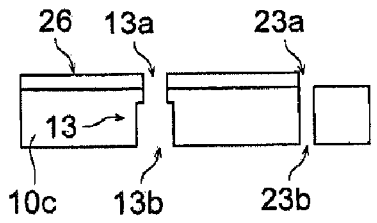

FIG. 1 is a plan view showing the processing pattern of the silicon substrate and FIG. 2 is a cross-sectional view showing the first embodiment of the manufacturing process of the silicon nozzle plate.

In FIG. 1, the nozzle hole forming patterns 19*a* and 19*b* formed on the front and rear surfaces of the silicon substrate 10 are shown by circles, the penetrating outer shape forming patterns 22*a* and 22*b* are shown by double lines, and the outer shape forming pattern 21*a* and 21*b* which are half etching part, are shown by bold line. To form the outer shape of the silicon substrate 10*c* representing the silicon nozzle plate, two long sides are formed based on the outer shape forming patterns 22*a* and 22*b* so as to penetrate silicon substrate 10*c* and two short sides are formed on both surfaces of the silicon substrate 10*c* based on the outer shape forming patterns 21*a* and 21*b* so as to be the half etching portions.

FIG. 2 is a cross-sectional view (cross section AA in FIG. 1) showing the forming process of the silicon substrate in a frame format. The processed silicon substrate 10*c* (FIG. 2(*b*)) is provided with the nozzle hole 13, and separated from the silicon substrate 10 (FIG. 2(*a*)) representing a material. The silicon substrate 10*c* is a silicon nozzle plate and a plurality of silicon nozzle plates can be obtained from the silicon substrate by being separated, however in the present example, number of the nozzle plate is one.

The nozzle hole 13 is formed in the processed silicon substrate 10*c*, and the nozzle hole 13 has two steps structure where a small diameter part 13*a* has a jetting hole in an ink jetting surface of the silicon substrate 10*c* and a large diameter part 13*b* having a large diameter is positioned behind the small diameter part 13*a*. Such structure is preferable from a view point that the strength of the silicon nozzle plate and the ink jetting performance can be compatible. In the present embodiment, the small diameter part 13*a* and the large diameter part 13*b* of the nozzle hole 13 are formed in a shape of cylinder which cross sections are substantially circle. Hereupon, the shape of the nozzle hole 13 is not limited to the shape shown in FIG. 1, and various nozzle holes whose shape are different, can be utilized. Further, it is not necessary that the hole diameter is set into two steps i.e. large and small, but three steps or more may also be allowable.

The silicon substrate 10 representing the material is not particularly limited, as far as it is the silicon on which etching processed is possible (FIG. 2 (*a*)). A film 12 which is an etching mask when the silicon substrate is etched, is provided on the surface of the silicon substrate 10. The material of the film 12 and the forming method are not particularly limited, however, when the silicon substrate 10 is etched, it is preferable that the etching resistance is superior, and an adhesiveness to the silicon substrate is superior, thus a thermal oxide film (silicon oxide) is preferable. The thickness of the film 12, can be determined through an experiment in advance, considering an etching rate, and an etching depth. In the example of embodiment a thickness of 1.5 μm is used.

Next, on an ink jetting side surface of silicon substrate 10 provided with film 12, nozzle hole processing pattern 19*a* having the first diameter corresponding to the small diameter part, and outer shape processing patterns 21*a* and 22*a* for separating the silicon substrate 10*c* which is formed from silicon substrate 10 are provided so as to form pattern film 12*a* (FIG. 2(*c*)). Further, on an ink inlet side surface of silicon substrate 10 provided with film 12, nozzle hole forming pattern 19*b* having the second diameter corresponding to the large diameter part, and outer shape forming pattern 21*b* and 22*b* for separating silicon substrate 10*c* formed from silicon substrate 10 are provided so as to form pattern film 12*b* (FIG. 2(*c*)).

As described above, in the present embodiment, in order to etch from both surfaces of the silicon substrate, nozzle hole processing pattern 19 and outer shape processing patterns 21 and 22 are formed on the both surfaces. Forming methods of nozzle hole forming pattern 19 and the outer shape forming pattern 21 and 22, are not particularly limited if the silicon substrate 10 or film 12 is not damaged, and for example, there are publicly known photo lithography processing, and etching processing. A Photo resist is coated on film 12, and exposure is conducted using a photo mask having the nozzle hole forming pattern 19 and outer shape forming patterns 21 and 22, and after the photo-resist is developed, etching processed is carried out using the photo resist pattern as a mask so as to remove the silicon substrate partially.

Herein, in the pattern film forming process of the silicon substrate, in respect to the nozzle hole forming pattern 19 having a predetermined diameter, it is important that the thermal oxide film is partially removed from the outer shape forming pattern in which at least one part has a narrower pattern width than the diameter. In the present embodiment, the aperture width of the outer shape forming pattern 21*a* of the etching mask is narrower than the first diameter, and the aperture width of the outer shape forming pattern 21*b* is narrower than the second diameter. That is, the pattern widths of the outer shape forming patterns 21*a* and 21*b* are designed narrow in the degree where the etching for the pattern does not penetrate the silicon substrate, even at the time of completion of the etching process of nozzle hole 13 so that the half etching part can be simultaneously formed with the nozzle hole 13, because the etching of the nozzle hole and the half etching for the separation are conducted in the same process, and the both can be formed together, then the manufacturing process can be simplified. Hereupon, the aperture widths of the outer shape processing patterns 22*a* and 22*b* are almost equal to the second diameter, thus the outer shape forming patterns 22*a* and 22*b* are caused to penetrate through the silicon substrate at the time of etching processing completion of the nozzle hole 13.

Herein, the first diameter and the second diameter respectively correspond to the diameter of the small diameter part and the diameter of the large diameter part of the nozzle 13, however, these diameter indicate the diameters when the cross section of the nozzle hole is a circle, and when the cross section shape is not circle, the diameter is a diameter of a circle having the same area as the cross section of the nozzle hole.

In this manner, the depth of the etching is controlled by the width or diameter of the mask pattern. As a rough standard of the pattern width for forming the half etching part as described above, the experimental data of the hole diameter (width) dependency of the etching depth in the process of the silicon substrate is shown in FIG. 3.

Figure 3:
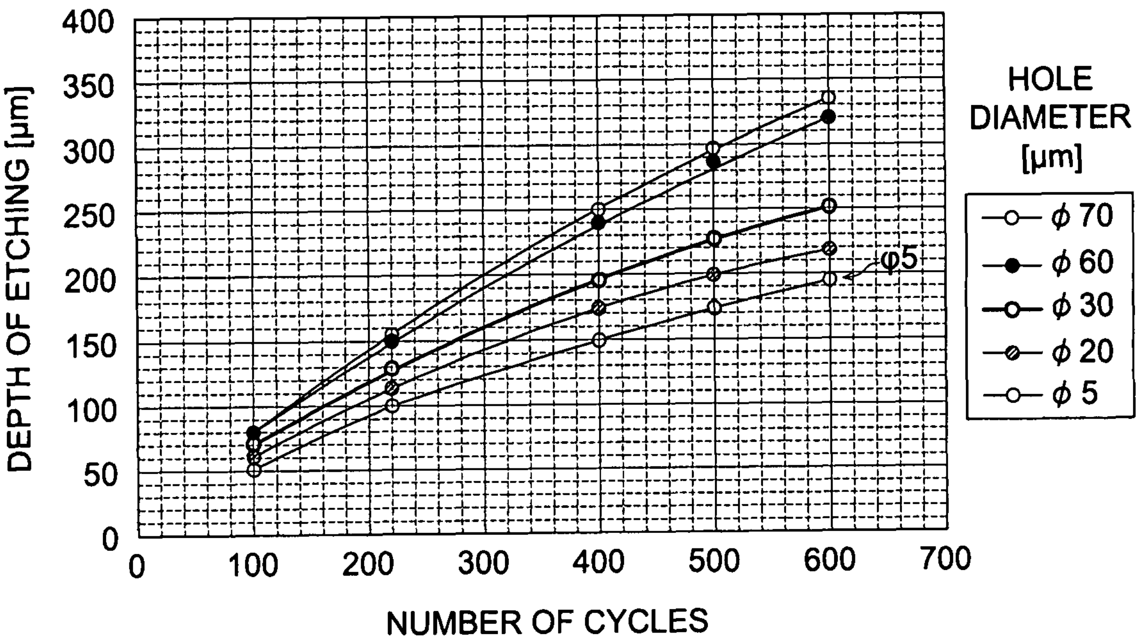
FIG. 3 is a diagram showing a hole diameter dependency of a etching depth in a forming process of the silicon substrate.

Here, in FIG. 3, while the experimental data the hole diameter dependency of etching depth concerning the nozzle hole is indicated, it has been confirmed that similar experiment data can be obtained by carrying out the same experiment for a groove depth. In FIG. 3, the horizontal axis is the cycle number of the etching in the Bosch process which will be described later, and the vertical axis shows the etching depth. In the actual processing, it is necessary that the graph as FIG. 3 is made based on the using apparatus, and etching condition, thus the width of the outer shape forming pattern is determined in respect to the diameter of the nozzle hole forming pattern with reference to FIG. 3 as the rough standard.

According to FIG. 3, for example, when the pattern width of the outer shape forming pattern is set about 5 μm, in respect to the diameter of the nozzle forming pattern of about 30 μm, it can be seen that a significant difference of etching rate is created between the nozzle hole part and the outer shape forming part.

Next, the etching process by the dry etching is conducted using the etching mask 12*b*, so as to form large diameter part 13*b*, the groove parts 23*b* and 24*b* of the outer shape processing (FIG. 2(*d*)). Next, the silicon substrate 10 is reversed, and using the etching mask 12*a*, the etching processing is conducted by the dry etching so as to form the small diameter part 13*a*, the groove parts 23*a* and 24*a* of the outer shape processing (FIG. 2(*a*)). When the nozzle hole 13 is penetrated and completed, the groove 24*b* of the outer shape forming penetrates. On the one hand, the groove 23*b* of the outer shape forming does not penetrate, to form the half etching part.

Even when the outer shape processing is completed, the silicon substrate 10*c* which is the silicon nozzle plate is not separated from the silicon substrate 10 due to the half etching part. Therefore, because the operation can be conducted by grasping an outside part of silicon substrate 10*c*, the handling becomes easy in the subsequent processes. Further, before the silicon substrate is bonded to the head chip, it is separated by cracking along the half etching part, thus there is almost no creation of the debris of the silicon and there is no problem that the debris is adhered to the surface of the nozzle plate, or the repulsive ink layer formed on the nozzle plate surface is not damaged. Further, the strength deterioration to create of breaking or chip from cracks does not cause.

Hereupon, in the dry etching, it is preferable to adopt the switching process (so-called Bosch process) by which the etching and side wall protection are repeated. In the Bosch process, when repeating the high speed etching of the silicon by fluorine radical, and by the forming of the protection film through the conformal CVD using CF gas, the deep-digging of the silicon with the high aspect ratio becomes easy. The protection film is formed not only on the side wall but also on the etching bottom surface, however, the protection film of the bottom surface is easily removed by the collision of fluorine ion having the high energy and simultaneously the silicon is further etched. Further, for the plasma adaptive for this process, the inductive combination type plasma (ICP) generation source by which the high resolution and high density plasma for securing the etching speed is obtained, and the condition setting in which the controllability from the low resolution to the high resolution is superior in CVD, can be conducted, is used.

Further, in the actual processing, for example, silicon or glass substrate is used as a base plate, and on this base plate, by using the grease or adhesive agent whose adhesive property is comparatively weak and is in the degree of grease, silicon substrate is tentatively fixed, it is preferable because the operability improves. As a specific example of the tentative fixing, for example, use of the heat conductive grease such as COOL-GREASE thermal grease, and a heat conductive adhesive sheet are quoted. Further, in the etching process described above, two processes i.e. the first process that the large diameter part side is processed (FIG. 2(*d*)) and the second process that the small diameter part side is processed (FIG. 2(*a*)), can be interchanged in order.

Next, after film 12 is removed by the wet-etching method or dry-etching method, it is washed (FIG. 2(*f*)).

Next, repulsive ink film 26 is formed on the surface of the ink jetting side of the silicon substrate (FIG. 2(*g*)). For the repulsive ink film 26, it is preferable that fluoric resin such as FEP (ethylene four fluoride, propylene six fluoride), PTFE (poly-tetra fluoro ethylene), fluoric siloxane, fluoro-alkyl silane, amorphous per fluoro resin, are used, and by using a method of coating or vacuum evaporation, the film is formed on the ink jetting surface.

Next, by dividing along the half etching part, it is separated into each silicon substrate 10*c* (silicon nozzle plate), and the manufacture of the silicon nozzle plate is completed (FIG. 2(*h*)).

Figure 4:
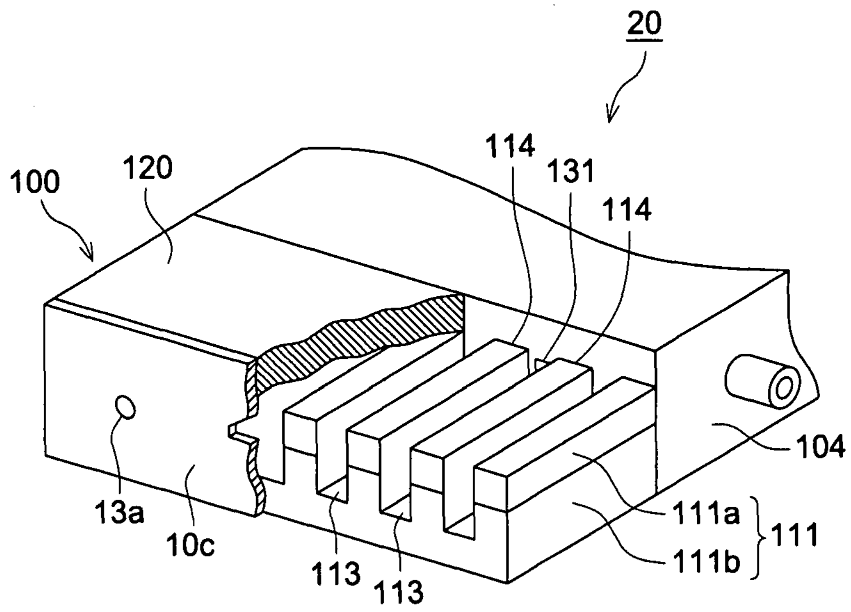
FIG. 4 is a partially broken perspective view showing a structural example of a multi-channel type inkjet head.

Next, as shown in FIG. 4, using the adhesive agent, the surface of the ink inlet side of the silicon substrate 10*c* (silicon nozzle plate) prepared in advance and the head chip 10 are adhered to each other, and the ink jet head 20 is formed.

As the ink jet head, its structure for generating the energy to jet the ink, may be any type, as far as it is structured so that the ink in the ink channel is jetted as an ink drop from the nozzle hole formed in one end of the ink channel, however, herein, there is quoted and described so-called shear mode type head in which the side wall constituting the ink channel is formed of the polarized piezoelectric material and when the electric field is applied to the side wall, shearing deformation is caused on the side wall, and the ink in the ink channel is jetted.

FIG. 4 is a partially broken perspective view showing a structural example of the multi-channel type ink jet head which is an example of the ink jet head.

In the drawing, numeral 100 represents a head chip, 10*c* represents a silicon nozzle plate related to the present invention, and numeral 104 represents an ink manifold.

The head chip 100 shown in the same drawing, is structured by an actuator substrate 111 and a cover substrate 120 adhered to the upper surface of the actuator substrate 111.

In the actuator substrate 111, two sheets of piezoelectric material substrates 111*a* and 111*b*, in which the deformation is generated when the electric field is applied, are jointed above and below by an epoxy adhesive agent while opposing the polarization directions each other. Then a plurality rows of grooves which are mutually parallel, are formed, at a predetermined pitch, by using the publicly known grinder such as a disk-like grinding stone (dicing plate) ranging over the two sheets of piezoelectric material substrates 111*a* and 111*b*, thus the channel 113 and the partition wall 114 are alternatively formed.

On the wall surface of each partition wall 114, the metallic electrode (not shown) for applying the electric field to the partition wall 114 is formed. As forming methods of this metallic electrode, a publicly known means such as vacuum evaporation method, spatter method, plating method can be used. In the embodiment shown by the figure, because the partition wall 114 is configured with two sheets of piezoelectric material substrates 111*a* and 111*b*, whose polarization directions are different, each metallic electrode is formed to drive both piezoelectric material substrates 111*a* and 111*b*, on entire surface of the side surface ranging over the piezoelectric material substrates 111*a*, and 111*b*, which at least constitutes each partition wall 114.

The cover substrate 120 is joined by the epoxy adhesive agent to the upper surface on which the channel 113 of the actuator substrate 111 is formed.

To the front end surface of the head chip 100, the silicon nozzle plate 10*c* having the small diameter part 13*a* representing the nozzle hole for ink jetting formed so that it corresponds to a plurality of channels 113, further, to the back end surface of the head chip 100, the ink manifold 104 for supplying the ink into the channel 113, are respectively joined by using the adhesive agent.

The nozzle plate 10*c* joined to the front surface of the head chip 100 composed of PZT representing the piezoelectric material, is formed by a piece of silicon substrate in a shape of plate. The thermal expansion coefficient of the silicon is 2.7 ppm/° C., and ordinarily used for the head chip 100. Because it is close to the thermal expansion coefficient (4-6 ppm/° C.) of PZT which is the piezoelectric material, it can be accurately joined to the head chip 100, further the generation of the distortion of the head chip 100, can be suppressed.

The Second Embodiment

The second embodiment is the same as the first embodiment, other than that the patterning and etching are conducted from one surface of the silicon substrate, the other part is same as the first embodiment.

Figure 5:
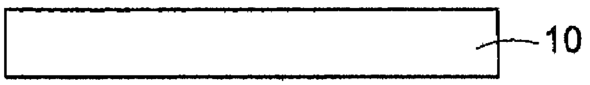
FIG. 5(*a-e*) is a cross-sectional view showing a second embodiment of the manufacturing process of the silicon nozzle plate.
Figure 5:
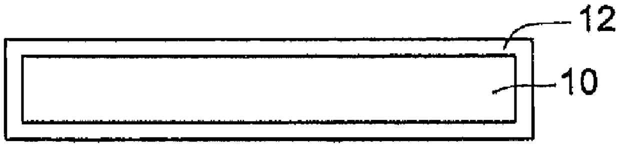
Figure 5:
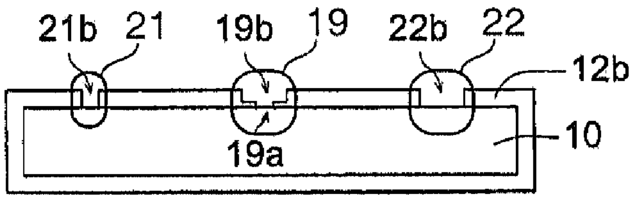
Figure 5:
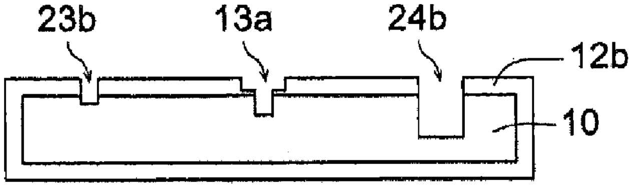
Figure 5:
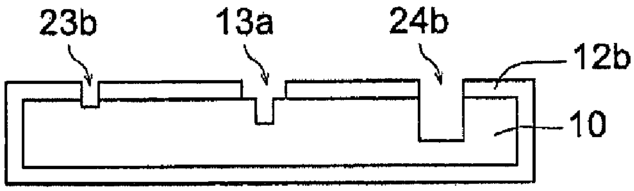
Figure 5:
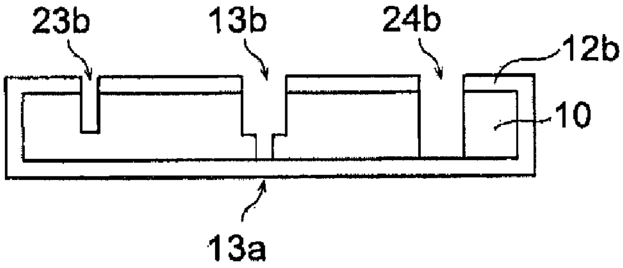

The processing pattern of the silicon substrate is basically the same as the pattern shown in FIG. 1. FIG. 5 is a cross-sectional view showing the second embodiment of the manufacturing process of the silicon nozzle plate. In FIG. 5, for the processes after (f), the illustration is omitted, because the processes after (f) of FIG. 2 are applied as they are.

The silicon substrate 10 is not particularly limited as far as the etching processing can be conducted, (FIG. 5(*a*)). On the surface of the silicon substrate 10, the film 12 which becomes the etching mask when the silicon substrate is etched, is provided (FIG. 5(*b*)).

Next, on the ink inlet side surface of the silicon substrate 10 on which the film 12 is provided, the nozzle hole forming pattern 19*b*, having the second diameter corresponding to the large diameter part, the nozzle hole forming pattern 19*a* having the first diameter corresponding to the small diameter part and the outer shape forming patterns 21*b* and 22*b* for separating the silicon substrate 10*c* processed from the silicon substrate 10 are provided, and the pattern film 12*b* is formed (FIG. 5(*c*)).

In this manner, in the present embodiment, because the etching process is conducted from the one surface of the silicon substrate, on the surface of the ink introduction side, the nozzle hole forming pattern 19 and the outer shape forming patterns 21 and 22 are formed. The forming method of the nozzle hole forming pattern 19 and the outer shape forming patterns 21 and 22 are not particularly limited as far as they do not damage the silicon substrate 10 and the film 12, for example, there are the publicly known photo-lithography process and the etching processing.

Initially, the photo-resist is coated on the film 12, and exposed by using the photo mask having the nozzle hole forming pattern 19*a* having the first diameter corresponding to the small diameter part and the outer shape forming patterns 21 and 22. Then after the photo-resist is developed, using the photo-resist pattern as the mask, the film 12 is etched and partially removed. Next, the photo-resist is coated on the film 12 again, and is exposed by using the photo-mask having the nozzle hole forming pattern 19*b* having the second diameter corresponding to the large diameter part, then after developing the photo-resist, the film 12 is etched using the photo-resist pattern as the mask, to be partially removed.

Herein, in the pattern film forming process of the silicon substrate, in respect to the nozzle hole forming pattern 19 having a predetermined diameter, it is important that the thermal oxide film is partially removed from the outer shape forming pattern in which at least one part has a narrower pattern width than the diameter. In the present embodiment, the aperture width of the outer shape processing pattern 21*b* of the etching mask is narrower than the first diameter (small diameter). That is, by designing the pattern width of the outer shape forming pattern 21*b* narrow in the degree where the silicon substrate does not penetrate when the etching processing of the nozzle hole 13 is completed, the half etching part can be simultaneously formed with the nozzle hole 13. Thus the etching of the nozzle hole and the half etching for separation are conducted in the same process, and the both process can be formed together, and then the manufacturing process can be simplified. Hereupon, when the aperture width of the outer shape forming pattern 21*b* is substantially equal to the second diameter, the outer shape forming pattern 22*b* penetrates the silicon substrate at the time of the etching processing completion of the nozzle hole 13.

Next, using the etching mask 12*b*, the etching process is conducted by dry etching, the small diameter part 13*a*, groove parts 23*b* and 24*b* of the outer shape forming pattern are formed (FIG. 5(*d*1)). Next, when the etching process is conducted by the dry etching, the pattern film 12*b* corresponding to the small diameter part 13*a* is partially removed (FIG. 5(*d*2)).

Using the etching mask 12*b*, the etching processing by the dry etching is conducted again, then the large diameter part 13*b*, the groove parts 23*b* and 24*b*, of the outer shape forming pattern are formed (FIG. 5(*e*)). When the nozzle hole 13 penetrates and completed, the groove 24*b* of the outer shape forming pattern is penetrated. On the one hand, the groove 23*b* of the outer shape forming pattern does not penetrate, and the half etching part is formed.

Hereinafter, the process after removal of the pattern film 12 of FIG. 2(*f*) is applied.

In the example of the outer shape forming pattern described in the above first and second embodiments, in the outer shape of the silicon substrate 10 which is the silicon nozzle plate, the pattern is formed so that outer shape forming pattern 22 forms two long sides, and outer shape forming pattern 21 forms two short sides which will be half etching parts. However, it is not limited to such patterns and is only necessary that at least one part of outer shape forming pattern is half etching part and remaining part is outer shape forming pattern which penetrates.

As mentioned above, in the manufacturing method of the silicon nozzle plate and inkjet head related to the present invention, since the silicon substrate is cleaved along the half etching portion, the debris of the silicon is not created substantially and the debris does not adhere on the plate surface, thus there is no problem that the ink repellent layer formed on the surface of nozzle plate is damaged. Further, deterioration of strength which creates breakages and flaws based on a crack does not occur. Also, at the time of completion of etching process where the nozzle holes penetrate the silicon substrate, the half etching portion created prevents the silicon substrate from separation and handling in the subsequent washing process becomes easy.

Also, since there is the pattern film forming process which partially removes the file from the nozzle hole forming pattern having a predetermined diameter and from the outer shape forming pattern which has at least one portion of which pattern width is narrower than the diameter, by designing at least one apertural area width of the outer shape forming pattern of etching mask narrow at a degree where the silicon substrate is not penetrated at the time of completion of etching process, the half etching portion can be formed simultaneously with the nozzle holes. Since a plurality of the nozzle plates are disposed on a silicon substrate and manufactured in the same time, the throughput regarding manufacturing the nozzle plate can be improved. Also, etching of nozzle hole and half etching for separation can be carried out in the same process, both can be formed simultaneously and simply.

EXAMPLES

Example 1

Figure 6:
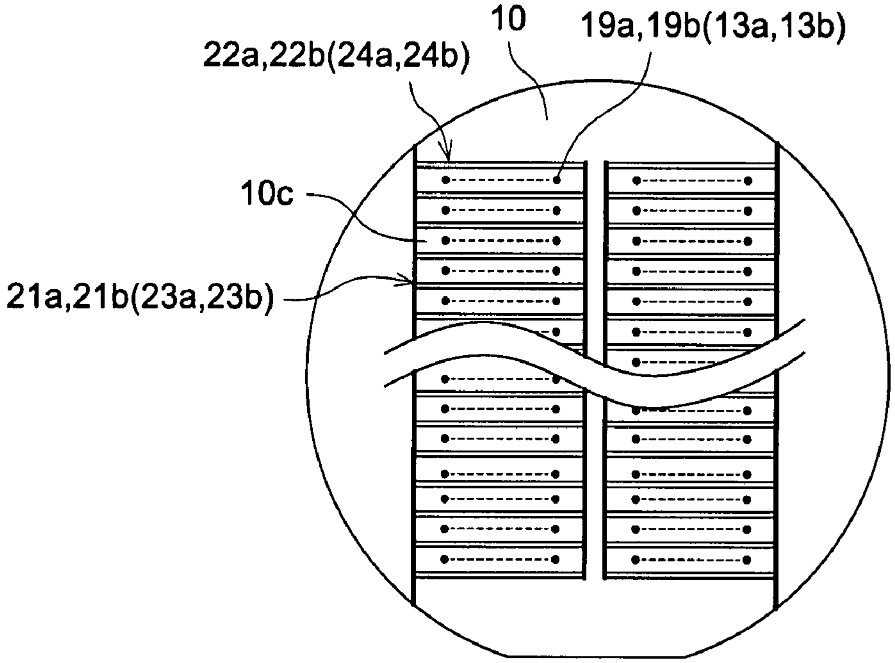
FIG. 6 is a view describing the forming pattern of the silicon substrate in the embodiment 1.

A plurality of pieces of silicon substrates 10*c* whose thickness is 200 μm and the dimension is 3 mm wide×41 mm long, having nozzle holes 13 where the diameter of small diameter part of the diameter (nozzle diameter) shown in FIG. 6 is 23 μm, the length of the nozzle small diameter part is 40 μm, the diameter of the large diameter part is 40 μm, the length of the nozzle large diameter part is 160 μm, the length of the nozzle hole (small diameter part+the large diameter part) is 200 μm, number of nozzle hole is 128 pieces in an array with the pitch of 141 μm, is made by using the silicon substrate 10 (hereinafter, called the silicon substrate) whose diameter is 6 inches.

In FIG. 6, black circles denote the nozzle hole forming patterns 19*a* and 19*b* formed on the front and rear surfaces of the silicon substrate 10, the outer shape forming patterns 22*a* and 22*b* which penetrate, are denoted by double lines, and the outer shape forming patterns 21*a* and 21*b* which are the half etching part, are denoted by bold line. In the outer shape of the silicon substrate 10*c* which is the silicon nozzle plate, patterning is arranged so that two long sides are processed by the outer shape forming patterns 22*a* and 22*b* which are penetrate, and two short side, are processed by the outer shape processing patterns 21*a* and 21*b* which are the half etching part.

Referring to FIG. 2 and FIG. 6, the description will be made below.

(1) The thermal oxide film 12 which is the etching mask and whose film thickness is 1.5 μm, is provided under the condition that the silicon substrate 10 is heated and maintained at 1000-1100° C. in the water vapor atmosphere by the thermal oxide method.

(2) After the photo resist was coated on the ink jetting side surface of the silicon substrate 10 on which the thermal oxide film 12 is provided, and is exposed by the mask aligner by using the photo mask, patterning is carried out through developing and etching for nozzle hole forming pattern 19*a* where the diameter of the nozzle hole is 23 μm, the pitch of the nozzle hole is 141 μm and number of nozzle holes in an array is 128, outer shape forming pattern 21*a* having pattern width 5 μm which is narrower than the nozzle diameter to form half etching pattern 22*a*, and outer shape forming pattern 22*a* having the pattern width of 40 μm which is larger than the nozzle hole diameter.

(3) Using the photo resist patterned as the etching mask, the thermal oxide film was partially removed by etching and the pattern film 12*a* is formed.

(4) After the photo resist was coated on the ink inlet side surface of the silicon substrate 10 on which the thermal oxide film 12 is provided, and is exposed by the mask aligner using the photo mask, patterning is carried out through developing and etching for nozzle hole forming pattern 19*a* where the diameter of the nozzle hole is 40 μm, the pitch of the nozzle hole is 141 μm and number of nozzle hole in an array is 128, outer shape forming pattern 21*b* having pattern width 5 μm which is narrower than the nozzle diameter to form half etching pattern 22*b*, and outer shape forming pattern 22*a* having the pattern width of 40 μm which is larger than the nozzle hole diameter.

(5) Using the photo resist patterned as the etching mask, the thermal oxide film is partially removed by etching and the pattern film 12*b* is formed.

(6) After the silicon substrate 10 is adhered and fixed on a dummy silicon wafer by the COOL-GREASE thermal grease, using the pattern film 12*b* made in (5) as the etching mask and by dry etching the silicon substrate 10 through the Bosch process, the large diameter part 13*b* of 160 μm depth and the groove parts 23*b* and 24*b* of the outer shape processing were formed.

(7) The silicon substrate 10 is reversed, and after adhered and fixed on the dummy silicon wafer by the COOL-GREASE thermal grease, using the pattern film 12*a* made in (3), as the etching mask, and by dry etching the silicon substrate 10 through the Bosch process, the small diameter part 13*a* of 40 μm in depth and the groove portions 23*a* and 24*a* of the outer shape processing are formed. When the nozzle hole 13 penetrates and is completed, the groove 24*b* of the outer shape process formed in (6) penetrates. On the one hand, the groove 23*b* of the outer shape process formed in (6) do not penetrate, thus the half etching part was formed.

(8) After the silicon substrate 10 is dipped in hydro fluoric acid which is the etching liquid for thermal oxide film, to remove the pattern film 12*a* and 12*b* perfectly, it was washed.

(9) On the surface of the ink jetting side of the silicon substrate 10, ink repulsive film 26 whose film thickness is 0.1 μm, formed of per fluoro alkyl silane, was filmed by the vapor deposition.

(10) By dividing along the half etching part, silicon substrates 10*c* (silicon nozzle plate) were separated.

Accordingly, the silicon substrate 10*c* whose dimension is 3 mm width×41 mm length, having the nozzle hole was obtained from the silicon substrate whose diameter is 6 inches.

As the result that the surface of the obtained silicon substrate is observed by the microscope, there is no disturbance of the shape of the nozzle hole, and no adherence of the debris or the occurrence of flaw are not seen. Further, any flaw of the repulsive ink film is not seen in good condition.

(11) Next, as shown in FIG. 4, the silicon substrate 10*c* (silicon nozzle plate) prepared hitherto and the head chip 100 are adhered together by using the epoxy adhesive agent, and heated to 100° C. to be hardened, thus the inkjet head 20 is made.

The thermal expansion coefficient of silicon is 2.7 ppm/° C. and because it is close to the thermal expansion coefficient (4-6 ppm/° C.) of PZT which is ordinarily used for the head chip 100 as piezoelectric material, the position dislocation in respect to the head chip 100 is not seen. Thus it was preferable.

According to the present embodiment, in case a plurality of nozzle plates are obtained form silicon substrate 10, since the nozzle plates are separated from the silicon substrate right before the nozzle plate is adhered onto head chip 100, the they can be handled as the silicon substrate in one piece and in the processes before the separation, nozzle plates are not handled individually thus handling is easy.

Example 2

Figure 7:
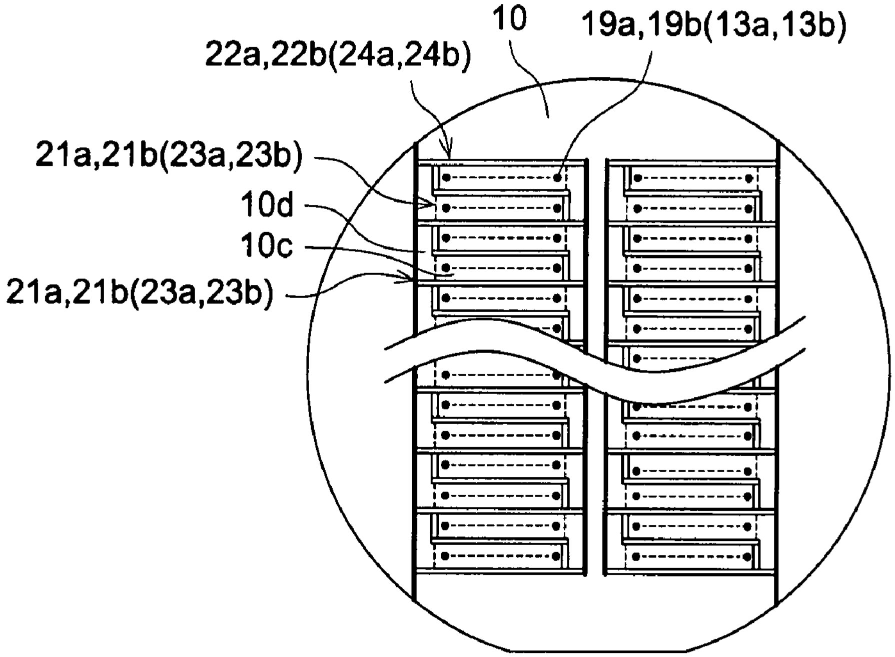
FIG. 7 is a view describing the forming pattern of the silicon substrate in the embodiment 2.

As shown in FIG. 7, the shape of the outer shape processing patterns 22*a* and 22*b* which are penetrating, is changed so that an tab portion 10*d* is formed, further, except for that the outer shape forming patterns 21*a* and 21*b* which become the half etching part for separating the tab portion 10*d* are added (added part is displayed by dotted line), the processes are carried out in the same manner as Example 1, and the nozzle plates are adhered to the head chip 100 under the condition where the tab portion 10*d* is attached, and then when by breaking along the half etching part (dotted line), the tab portion 10*d* is separated.

Evaluation result was as good as Example 1.

Further, in the present embodiment, in the process of (10), the tab portion 10*d* protruding from the silicon substrate 10*c* (silicon nozzle plate) is formed. In case the tab portion 10*d* is provided, in the process adhering to the head chip 100 of (11), handling becomes easy because operation can be conducted by grasping the tab portion 10*d*.

In the manufacturing method of the silicon nozzle plate and the inkjet head related to the present invention is a method where the silicon substrate is separated by being divided along the half etching portion, there is almost no occurrence of silicon debris, and there is no problem that the debris is adhered to the nozzle plate surface, or the repulsive ink layer formed on the nozzle plate surface is damaged. Further, the strength deterioration such that the crack or chip is generated on the basis of the crack, is not caused.

Further, also at the time of the completion of etching process by which the nozzle hole is penetrated through the silicon substrate, the half etching portion is formed and the silicon substrate is not divided into many pieces, thus in the subsequent washing process, handling is conducted easily.

Further, the nozzle holes are formed by etching the silicon substrate using the pattern film as the etching mask and the half etching portion is formed at least in one portion of the outer shape forming pattern, thereby the half etching portion can be formed with the nozzle holes. because it has a pattern film forming process by which the film is partly removed in the nozzle hole forming pattern having a predetermined diameter, and the outer shape forming pattern having the pattern width at least whose one part is narrower than the diameter, when an aperture width of at least one part of the outer shape forming pattern of the etching mask is designed narrow in the degree in which it is completed in a form that the aperture width does not penetrate through the silicon substrate, Because a plurality of nozzle plates are arranged on one silicon substrate, and can be manufactured simultaneously, trough-put of the nozzle plate manufacturing can be improved, and the etching of nozzle hole and the half etching for separation are conducted in the same process, the both can be formed together, and the manufacturing process can be simplified.

What is claimed is:

1. A manufacturing method of a silicon nozzle plate, wherein nozzle holes are formed by etching a silicon substrate, comprising:

forming a film to provide the film representing an etching mask for etching the silicon substrate on a surface of the silicon substrate;

forming a pattern film by partially removing the film based on a nozzle hole forming pattern and an outer shape forming pattern;

etching the silicon substrate to form nozzle holes to penetrate through the silicon substrate based on the nozzle hole forming pattern representing the etching mask, and to form groove sections of the outer shape forming pattern having a half etching portion at least in a part of the silicon substrate based on the outer shape forming pattern; and separating the silicon substrate by cleaving along the half etching portion;

wherein the outer shape forming pattern includes a first pattern having a predetermined first pattern width and a second pattern having a second pattern width which is narrower than the predetermined first pattern width; and wherein the second pattern width is narrower than a diameter of the nozzle hole; and wherein the half etching portion and the nozzle hole that penetrates through the silicon substrate are formed together in the same etching step.

2. The manufacturing method of the silicon nozzle plate of claim 1, wherein a first part of the silicon substrate corresponding to the first pattern is etched as a full etching portion and a second part of the silicon substrate corresponding to the second pattern is etched as the half etching portion in the etching process.

3. The manufacturing method of the silicon nozzle plate of claim 1, wherein the silicon nozzle plate is substantially rectangular in an outer shape and the half etching portion forms one of a short side of the silicon nozzle plate.

4. The manufacturing method of the silicon nozzle plate of claim 1, further comprising:

removing the pattern film to remove the pattern film which is carried out between the etching process and the separation process; and forming a water-repellent film on the surface of the silicon substrate.

5. The manufacturing method of the silicon nozzle plate of claim 1, wherein the silicon plate has a size capable of forming a plurality of the silicon nozzle plates, the film is partially removed based on a plurality of the nozzle hole forming patterns and the outer shape forming patterns in the pattern film forming process, and the silicon substrate is split along the half etching portion to separate into individual silicon nozzle plates in the separating process.

6. The manufacturing method of the silicon nozzle plate of claim 1, wherein the etching process is a dry etching process.

7. A manufacturing method of an inkjet head, wherein a head chip and a silicon plate on which nozzle holes are formed by etching a silicon substrate are bonded to manufacture the inkjet head, comprising:

forming a film to provide a film representing an etching mask for etching the silicon substrate on a surface of the silicon the silicon substrate;

forming a pattern film by partially removing the film based on a nozzle hole forming pattern, an outer shape forming pattern and a tab portion adjacent to the outer shape forming pattern;

etching the silicon substrate using the pattern film as the etching mask to form nozzle holes based on the nozzle hole forming pattern, to form a first half etching portion at least in a part of the silicon substrate based on the outer shape forming pattern, and to form a second half etching portion along a border between the outer shape forming pattern and a tab portion;

separating the silicon substrate by splitting along the first half etching portion; and splitting the tab portion from the separated silicon nozzle plate along the second half etching portion after jointing with the head chip;

wherein the outer shape forming pattern includes a first pattern having a predetermined first pattern width and a second pattern having a second pattern width which is narrower than the predetermined first pattern width; and wherein the second pattern width is narrower than a diameter of the nozzle hole; and wherein the first half etching portion, the second half etching portion, and the nozzle hole that penetrates through the silicon substrate are formed together in the same etching step.

8. The manufacturing method of the inkjet head of claim 7, further comprising:

removing the pattern film carried out between the etching process and the separating process; and forming a water-repellent film on the surface of the silicon substrate.

* * * * *